United States Patent [19]

Takahashi

[11] Patent Number: 5,610,462
[45] Date of Patent: Mar. 11, 1997

[54] BRUSHLESS MOTOR

[75] Inventor: Shuji Takahashi, Yonago, Japan

[73] Assignee: Nidec Corporation, Kyoto, Japan

[21] Appl. No.: 262,766

[22] Filed: Jun. 20, 1994

[30] Foreign Application Priority Data

Jun. 22, 1993 [JP] Japan .................. 5-176029
Jun. 22, 1993 [JP] Japan .................. 5-176030
Aug. 6, 1993 [JP] Japan .................. 5-195926

[51] Int. Cl.⁶ .................. H02K 7/08; H02K 5/16
[52] U.S. Cl. .................. 310/90
[58] Field of Search .................. 310/67 R, 90, 310/91; 384/279, 295, 428, 902

[56] References Cited

U.S. PATENT DOCUMENTS

| | | | |
|---|---|---|---|
| 3,772,544 | 11/1973 | Wrobel .................. | 310/67 R |
| 3,777,191 | 12/1973 | Papst et al. .................. | 310/67 R |
| 3,786,290 | 1/1974 | Papst et al. .................. | 310/90 |
| 4,013,326 | 3/1977 | King .................. | 384/113 |
| 4,612,468 | 9/1986 | Sturm et al. .................. | 310/90 |
| 4,613,778 | 9/1986 | Wrobel et al. .................. | 310/67 R |
| 4,856,918 | 8/1989 | Inoue et al. .................. | 384/245 |
| 4,955,791 | 9/1990 | Wrobel .................. | 310/67 R |
| 5,258,672 | 11/1993 | Wrobel .................. | 310/90 |

FOREIGN PATENT DOCUMENTS

| | | | |
|---|---|---|---|
| 60-69324 | 4/1985 | Japan .................. | 384/279 |
| 4-160224 | 6/1992 | Japan .................. | 384/279 |
| 6-173953 | 6/1994 | Japan .................. | 384/279 |

*Primary Examiner*—Clayton E. LaBalle
*Attorney, Agent, or Firm*—McCormick, Paulding & Huber

[57] ABSTRACT

There is disclosed a brushless motor in which an oil-impregnated sleeve bearing is inserted in a bearing holder having a cylindrical shape with a closed bottom, and a rotating shaft is inserted in the oil-impregnated sleeve bearing in such a manner that the rotating shaft may freely rotate. With this arrangement, it becomes possible to prevent lubricant from leaking out without increasing either the number of component elements or the number of assembling steps. The oil-impregnated sleeve bearing comprises an inner and outer layers. An oil seat is disposed on the oil-impregnated sleeve bearing at the open-end side of the bearing holder. The percentages of voids are set such that the percentages of voids become lower in the order of the oil seal, the outer layer, and the inner layer. With the above arrangement, the lubricant can be prevented from leaking out through a gap of the bearing, and therefore reduction of life due to the leakage of lubricant can also be prevented.

5 Claims, 7 Drawing Sheets

BRUSHLESS MOTOR

BACKGROUND OF THE INVENTION

The present invention relates to a brushless motor, and more specifically to an improved technique of supporting a rotating shaft by a cylindrical sleeve bearing.

Description of the Related Art

One known technique regarding a bearing for supporting a rotating shaft of a brushless motor such as a fan motor is to use a radial bearing having a cylindrical form which is fit and held in a bearing holder having a cylindrical form. In this technique, as described for example in U.S. Pat. No. 5,258,672, the rotating shaft is supported in the thrust direction by using a bearing structure configured in such a way that the end portion of the rotating shaft is pulled out through the open bottom end of the bearing holder, and a stopper ring is attached to the end portion of the rotating shaft so as to prevent the rotating shaft from coming off. In another technique, as described in U.S. Pat. No. 4,613,778 or U.S. Pat. No. 4,955,791, the open bottom end of the bearing holder is closed with a fitting element, and a thrust bearing for supporting the end portion of rotating shaft in the axial direction is attached to the fitting element.

However, the above conventional techniques have the following problems. In the technique in which a stopper ring is attached to the end portion of a rotating shaft, lubricant impregnated in bearing elements can easily escape to the outside through the open end portion of a bearing holder. On the other hand, in the technique in which a fitting element is fit in the open end of a bearing holder, a greater number of component elements have to be assembled by a greater number of assembling steps.

Even in the technique in which the open end of a bearing holder is closed with a fitting element, lubricant can still leak through a gap between a radial bearing and a rotating shaft, and thus peripheral areas may be contaminated, or the life of the bearing will be shortened due to the leakage of lubricant.

In the brushless motor of this type, a stator core is fit around the bearing holder. If the bearing holder made of a synthetic resin is used, the bearing holder is easily deformed when the stator core is fit around the bearing holder. The deformation of the bearing holder affects the radial bearing, and thus gives rise to a difficulty in smooth rotation of the rotating shaft.

SUMMARY OF THE INVENTION

It is a first object of the present invention to provide a brushless motor in which leakage of lubrication may be prevented without increasing the number of component elements and the number of assembling steps.

It is a second object of the present invention to provide a brushless motor in which no lubricant escapes through a gap of a bearing, and thus reduction in the life of the bearing due to the leakage of lubricant can be prevented.

It is a third object of the present invention to provide a brushless motor in which a stator core of a stator can be attached around a bearing holder without affecting a bearing disposed in the bearing holder, and therefore the shaft may rotate smoothly.

Other objects and features of the present invention will become apparent from the following description.

DESCRIPTION OF THE PREFERRED EMBODIMENTS

Figure 1:
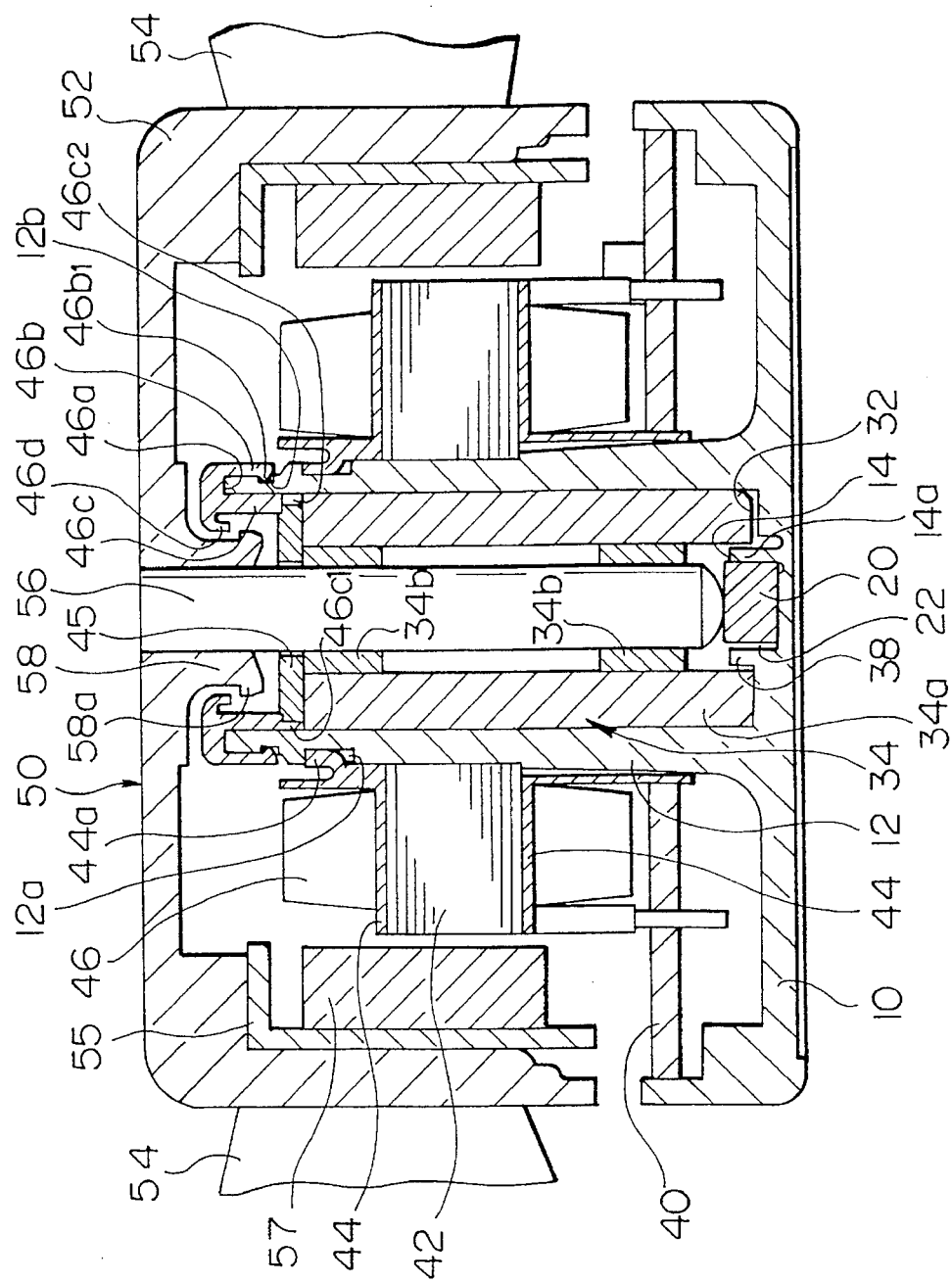
FIG. 1 is a cutaway elevational view illustrating a first embodiment of a brushless motor according to the present invention.

Referring to the accompanying drawings, preferred embodiments of the present invention will be described in more detail.

Referring to FIGS. 1–7, a first embodiment of a brushless motor according to the present invention will be described first. In this embodiment, the present invention is applied to a brushless motor for use in a fan.

The brushless motor includes a dish-shaped bracket 10 whose aperture faces up. The bracket 10 is provided with a bearing holder 12 in the form of a cylinder whose bottom end is closed, wherein the bearing holder 12 extends upward from the central portion of the bracket 10. A thrust bearing element holder 14 formed in the shape of a cylinder whose bottom end is closed is disposed on the bottom of the bearing holder 12. The thrust bearing element holder 14 has three inward protrusions 16 projecting inward from its inner wall, wherein the three inward protrusions 16 are equally spaced by 120°. As shown in Figure, the cross section of each inward protrusion 16 has an arc shape. Grooves 18 are formed in peripheral portions of the bottom of the thrust bearing element holder 14 at positions corresponding to the inward protrusions 16 wherein the lengths in the circumferential direction of these grooves 18 are slightly greater than those of the inward protrusions 16.

A thrust bearing element 20 having a substantially cylindrical shape is fit into the thrust bearing element holder 14, and is held by the inward protrusions 16. The thrust bearing element 20 is held by the thrust bearing element holder 14 at the circumferential centers of the respective inward protrusions 16, that is, at supporting portions 16a. A space 22 is formed between the inner circumferential face of the thrust bearing element holder 14 and the outer circumferential face of the thrust bearing element 20 except for supporting portions 16a. Therefore, the grooves 18 extend in the circumferential direction to the space 22 passing via the supporting portions 16a. When the thrust bearing element 20 is inserted into the thrust bearing element holder 14, air is pushed out from the space between the thrust bearing element 20 and the thrust bearing element holder 14, and escapes easily to the outside through the spaces 22.

Air existing between the bottom of the thrust bearing element holder 14 and the lower end portions of the thrust bearing element 20 corresponding to those portions supported by the supporting portions 16a may also escape to the space 22 through the grooves 18. Therefore, the closed bottom of the cylindrical thrust bearing element holder 14 does not create air which obstructs the insertion of the thrust bearing element 20 into the thrust bearing element holder 14, since air existing between the thrust bearing element 20 and the thrust bearing element holder 14 can easily escape to the outside, whereby reliable fitting can be easily achieved.

Figure 2:
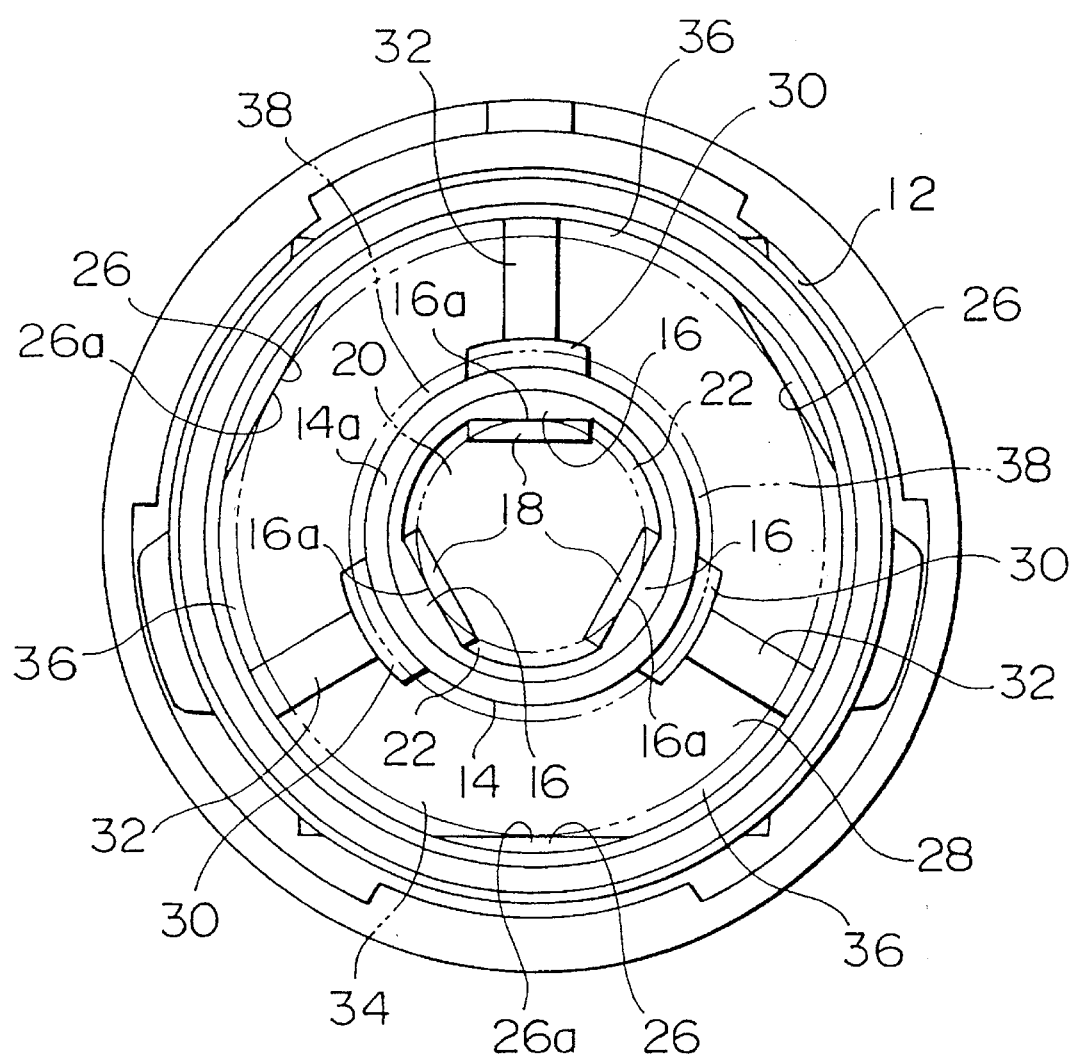
FIG. 2 is a plan view illustrating a bearing holder of the brushless motor of FIG. 1.
Figure 3:
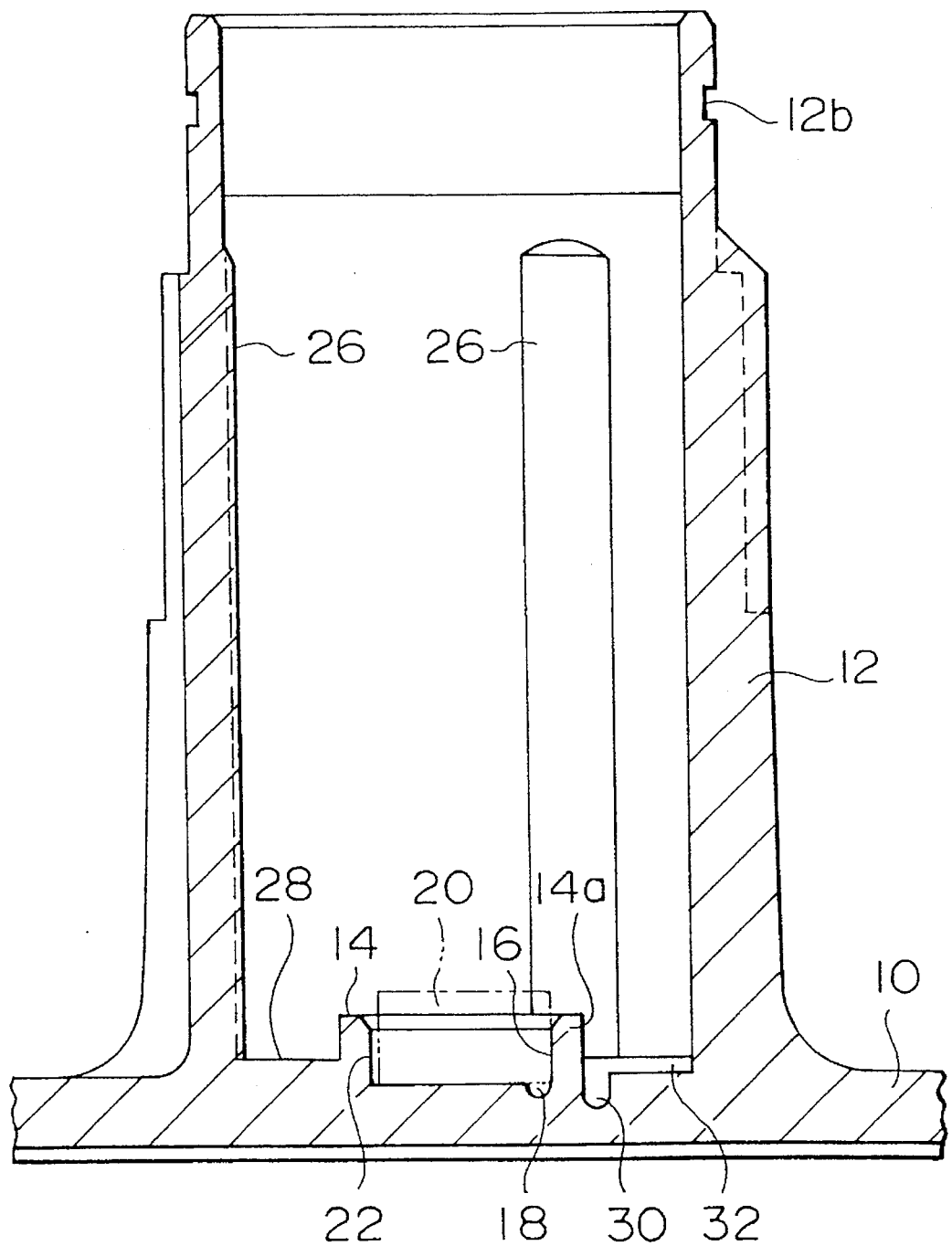
FIG. 3 is a cutaway elevational view illustrating the bearing holder shown in FIG. 2.

There are formed three inward protrusions 26 spaced by 120° on the inner wall of the bearing holder 12, wherein the position of each inward protrusion 26 is 60° off from the corresponding inward protrusion 16 of the thrust bearing element holder 14. The cross section of each inward protrusion 26 also has an arc shape as shown in FIG. 2. In regions on or near the inner circumference of the ring-shaped bottom area 28 between the inner wall of the bearing holder 12 and the outer wall of the thrust bearing element holder 14, there are formed circumferential grooves 30 having relatively large depths and having circumferential lengths nearly equal to those of grooves 18 at locations on the prolonged lines extending outward from the grooves 18 in radial directions. A radial groove 32 having a relatively small depth is formed between the circumferential center of each circumferential groove 30 and the inner wall of the bearing holder 12.

Since the circumferential wall 14a of the thrust bearing element holder 14 has greater heights at portions between the grooves 18 and the circumferential grooves 30 compared to heights at the other portions, these higher portions allow the circumferential wall 14a to well follow the outer shape of the thrust bearing element 20, which ensures that the thrust bearing element 20 is fit well in the thrust bearing element holder 14, and that damage due to deformation is prevented.

There is provided an oil-impregnated sleeve bearing (radial bearing) 34, which comprises an outer cylindrical layer 34a having a relatively great length and two inner cylindrical layers 34b each having relatively small lengths wherein one of inner cylindrical layers 34b is disposed on the inner wall of the upper end portion of the outer cylindrical layer 34a and the other one is disposed on the inner wall of the lower end portion of the outer cylindrical layer 34a. The oil-impregnated sleeve bearing 34 has a substantially cylindrical shape as a whole. The outer and inner cylindrical layers 34a and 34b are made up of sintered metal wherein the inner cylindrical layer 34b has a lower percentage of voids than the outer cylindrical layer 34a has.

The oil-impregnated sleeve bearing 34 is fit into the bearing holder 12. The inward protrusions 26 hold the oil-impregnated sleeve bearing 34 at its outer cylindrical face. The oil-impregnated sleeve bearing 34 is held by the inward protrusions 26 at their circumferential-center portions, that is, at supporting portions 26a, so that there is outer space 36 between the inner wall of the bearing holder 12 and the outer wall of the outer cylindrical layer 34a except for supporting portions 26a. There is an inner space 38 between the inner wall of the lower end portion of the outer cylindrical layer 34a and the outer circumferential face of the thrust bearing element holder 14. The lower end face of the oil-impregnated sleeve bearing 34, that is, the lower end face of the outer cylindrical layer 34a is in contact with the ring-shaped bottom area 28 except for the circumferential grooves 30 and the radial grooves 32.

When the oil-impregnated sleeve bearing 34 is inserted into the bearing holder 12, air is pushed out from the space between the oil-impregnated sleeve bearing 34 and the bearing holder 12, and escapes easily to the outside of the bearing holder 12 through the outer and inner spaces 36 and 38. Air existing in the space between the lower portion of the outer cylindrical layer 34a and the ring-shaped bottom area 28 of the bearing supporter escapes to the outer and inner spaces 36 and 38 through the radial and circumferential grooves 32 and 30. Therefore, the closed bottom of the cylindrical bearing holder 12 does not create air which obstructs the insertion of the oil-impregnated sleeve bearing 34 into the bearing holder 12, since the air existing between the oil-impregnated sleeve bearing 34 and the bearing holder 12 and between the oil-impregnated sleeve bearing 34 and the thrust bearing element holder 14 can easily escape to the outside, which ensures that reliable fitting can be easily achieved.

An electric circuit board 40 is fit and held around the bearing holer 12 at a lower position. A stator coil 46 is wound around a stator core 42 via an insulator 44 made up of an insulating synthetic resin. The stator core 42 is fit around the bearing holder 12 at a middle position between the upper and lower ends. The insulator 44 has a fitting holder 44a having a J-shaped cross-section on the inner wall of its upper end portion. This fitting holder 44a can be fit in a ring-shaped groove 12a formed on the outer wall of the upper end portion of the bearing holder 12, and the upper end of the fitting holder 44a comes in contact with the upper face of the ring-shaped groove 12a whereby the fitting holder 44a is held in the ring-shaped groove 12a.

A ring-shaped oil seal 45 made of felt is disposed on the oil-impregnated sleeve bearing 34 in such a manner that the lower face of the oil seal 45 is in contact with the upper face of the oil-impregnated sleeve bearing 34, that is, with the upper faces of the outer and inner cylindrical layers 34a and 4b. The oil seal 45 has a greater percentage of voids than the outer cylindrical layer 34a has. Maximum oil contents (maximum volume % contents of oil) may be for example about 30%, 25%, 20% for the oil seal 45, the outer cylindrical layer 34a, and the inner cylindrical layer 34b, respectively.

Figure 4:
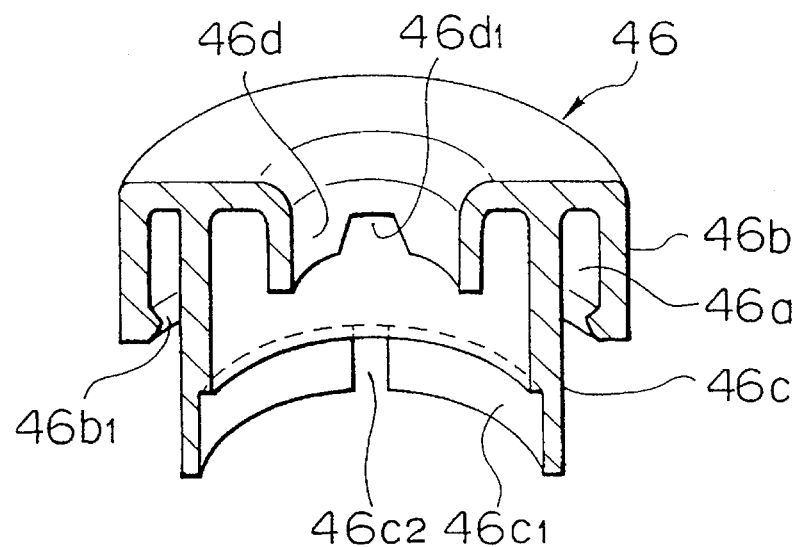
FIG. 4 is a cutaway perspective view illustrating a cap of the brushless motor shown in FIG. 1.

As shown in FIG. 4, there is also provided a cap 46 made of a synthetic resin, which has an outer and middle ring-shaped walls 46b and 46c forming a ring-shaped groove 46a facing down, and which further has a bent cylindrical wall 46d which extends from the inner side of the upper end portion of the middle ring-shaped wall 46c and is bent downward inside the middle ring-shaped wall 46c. The cap 46 is disposed on the bearing holder 12 in such a manner that the ring-shaped groove 46a receives the upper end portion of the bearing holder 12, and the inward protrusion 46b1 formed on the inner side of the ring-shaped groove 46a is fit into the ring-shaped groove 12b formed on the outer side of the bearing holder 12 whereby the cap 46 is held to the upper portion of the bearing holder 12. An expanded-inner-diameter portion 46c1 is formed in the lower portion of the middle ring-shaped wall 46c. Two cut-away portions 46c2 facing down are formed in the expanded-inner-diameter portion 46c1, wherein the cut-away portions 46c2 are spaced by 180°. The lower end face of the middle ring-shaped wall 46c is in contact with the outer portion of the upper end face of the oil-impregnated sleeve bearing 34, and the upper end face of the expanded-inner-diameter portion 46c1 is in contact with the outer portion of the upper end face of the oil seal 45, thereby preventing the oil-impregnated sleeve bearing 34 and the oil seal 45 from coming off. Two cut-away portions 46d1 are formed at 180° spacing in the lower portion of the bent cylindrical wall 46d in such a manner that the apertures of the cut-away portions 46d1 face down and the circumferential widths decreases in the upward direction like a trapezoid.

There is provided an impeller 50 comprising a rotor frame 52 having a shape similar to that of a cup wherein blades 54 are disposed on the outer side of the cylindrical wall of the rotor frame 52, and a rotating shaft 56 is disposed in the center of the rotor frame 52. A rotor yoke 55 having a substantially cylindrical form is fixed to the inner side of the cylindrical wall of the rotor frame 52 wherein the upper end portion of the rotor yoke 55 is bent inward.

Figure 5:
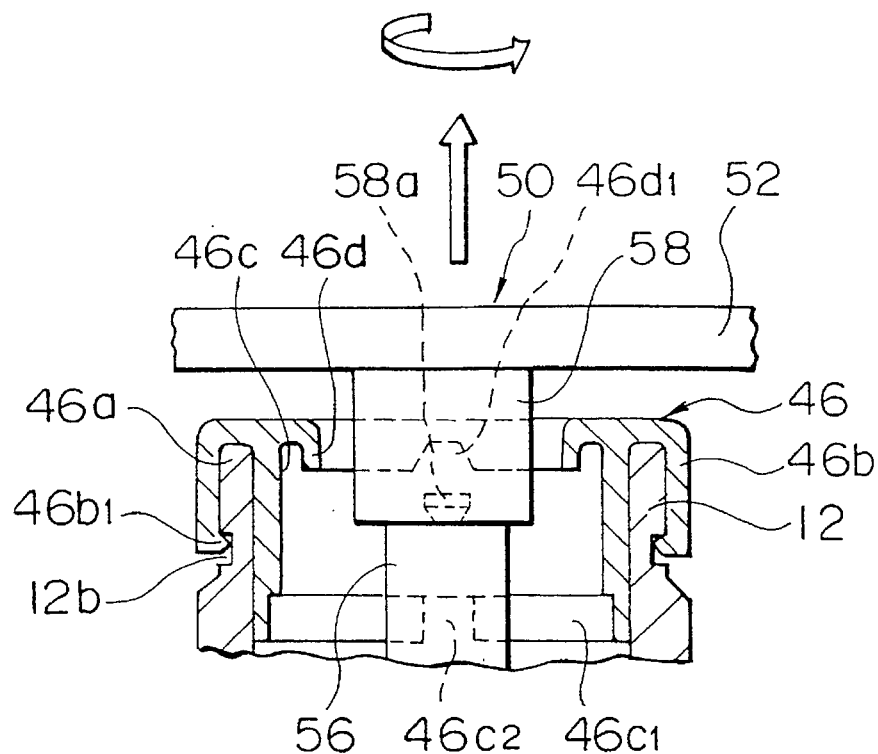
FIG. 5 is a cutaway elevational view illustrating the cap, the bearing holder, and an impeller shown in FIG. 1.
Figure 6:
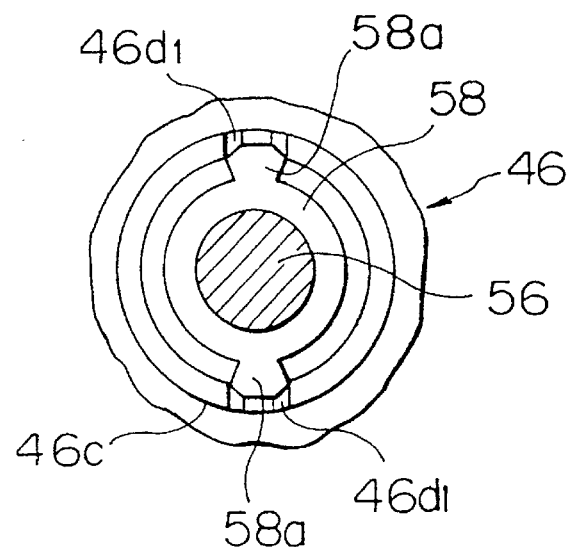
FIG. 6 is a bottom view partially illustrating those elements shown in FIG. 5.
Figure 7:
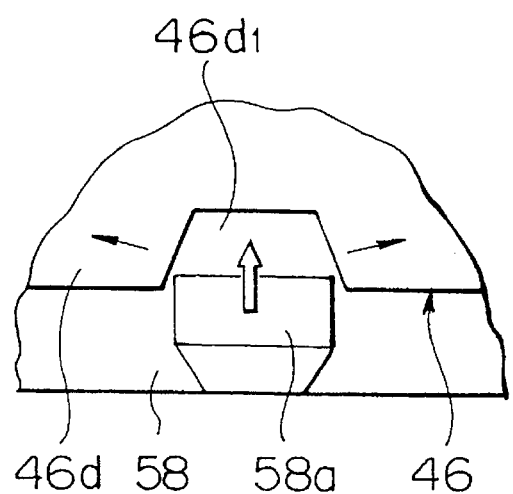
FIG. 7 is a enlarged schematic illustrating connection between the cap and impeller shown in FIG. 5.

The base portion of the rotating shaft 56 is supported by the boss 58 of the rotor frame 52. As shown in FIGS. 5–7, outward protrusions 58a corresponding to the respective cut-away portions 46d1 are formed in the lower portion of the boss 58 wherein the outward protrusions 58a project outward in the radial direction. The circumferential length of the upper portion of each outward protrusion 58a is smaller than the circumferential length of the aperture of the cut-away portion 46d1, and greater than the circumferential length of the upper portion of the cut-away portion 46d1. The radius from the rotation axis to the outer end of the outward protrusion 58a is greater than the inner radius of the lower end portion of the bent cylindrical wall 46d, and smaller than the outer radius of the lower end portion of the bent cylindrical wall 46d.

As described above, the cylindrical bearing holder 12 has a closed bottom, and the oil-impregnated sleeve bearing 34 has a substantially cylindrical shape as a whole. However, the shapes of these elements do not cause creation of air which obstructs the insertion of the rotating shaft 56 into the oil-impregnated sleeve bearing 34, because when the rotating shaft 56 is inserted from up to down into the oil-impregnated sleeve bearing 34, air existing in the inside of the oil-impregnated sleeve bearing 34 is pushed out and escape upward to the space above the bearing holder 12 through the inner space 38, the circumferential grooves 30, the radial grooves 32, the outer spaces 36, the cut-away portions 46c2, and the space of the oil seal 45. At the time when the elements are assembled into an apparatus, lubricant is not contained in the oil seal 45 yet.

When the rotating shaft 56 is inserted from up to down into the oil-impregnated sleeve bearing 34, the outward protrusions 58a come in contact with the bent cylindrical wall 46d. However, the bent cylindrical wall 46d can be bent inward and downward, and the lower end face of the outward protrusions 58a can be inclined upward and outward in the radial direction. Therefore, when the impeller 50 is pushed downward, the bent cylindrical wall 46d is elastically deformed outward in the radial direction, and at the same time the outward protrusions 58a and the boss 58 are also elastically deformed slightly inward in the radial direction, whereby the outward protrusions 58a can get over the bent cylindrical wall 46d. In this way, the outward protrusions 58a come in place between the oil seal 45 and the bent cylindrical wall 46d, and thus the rotating shaft 56 is supported by the oil-impregnated sleeve bearing 34 in such a manner that the rotating shaft 56 can freely rotate, and that the rotating shaft 56 is prevented from coming off the oil-impregnated sleeve bearing 34. The outward protrusions 58a are formed in such a manner that their upper end faces are in a horizontal plane so as to prevent the rotating shaft 56 from easily coming off. The rotor magnet 57 and the stator core 42 are opposed to each other in a radial direction via a space. Since the magnetic center of the rotor magnet 57 is at a position higher in the direction of the axis than that of the stator core 42, the impeller 50 is subjected to force exerted downward in the direction of the axis during its rotation. Thus, during the rotation, the lower end of the rotating shaft 56 is supported in the axial direction by the upper face of the thrust bearing element 20.

Since the bearing holder 12 has a cylindrical shape with a closed bottom, if some lubricant in a liquid phase exudes from the inner cylindrical layer 34b of the oil-impregnated sleeve bearing 34 to the space in the oil-impregnated sleeve bearing 34, such lubricant tries to leak upward to the open end side of the bearing holder 12. However, since the ring-shaped oil seal 45, which is in contact with the upper face of the bearing holder 12 of the oil-impregnated sleeve bearing 34, has a relatively high percentage of voids, the lubricant is absorbed effectively by the oil seal 45.

Since the percentage of voids becomes lower in the order of the oil seal 45, the outer cylindrical layer 34a, and the inner cylindrical layer 34b, the lubricant absorbed into the oil seal 45 flows to the outer cylindrical layer 34a of the oil-impregnated sleeve bearing 34 due to the capillarity, and further flows to the inner cylindrical layer 34b from the outer cylindrical layer 34a. A part of the lubricant absorbed in the oil seal 45 also flows directly toward the inner cylindrical layer 34b. Thus, the lubricant circulates smoothly in the above-described manner, which effectively prevents the lubricant from leaking out to the outside. In this way, contamination in the peripheral area due to the scattering of the lubricant is prevented. Furthermore, the life of the bearing and thus the total life of the motor become longer.

When it is required to pull out the rotating shaft 56 for maintenance or repair, if the outward protrusions 58a are fit in the cut-away portions 46d1 as shown in FIGS. 6 and 7, and if the impeller 50 is rotated and moved upward relative to the bracket 10, then the cut-away portions 46d1 are expanded elastically in circumferential directions, and the inner diameter of the bent cylindrical wall 46d is expanded and the bent cylindrical wall 46d is deformed toward the outer side of the outward protrusions 58a, and thus finally the outward protrusions 58a come off the cut-away portions 46d1. Thus, the lock of the rotating shaft 56 is released, and now the rotating shaft 56 can be removed from the bearing.

The embodiment described above are given only as examples, and it is not intended that dimensions, numbers, materials, shapes, and relative positions regarding the component elements limit the present invention, unless it is clearly described that the invention is limited to those.

As described above, in the brushless motor configured in the above-described manner, the oil-impregnated sleeve bearing 34 having the substantially cylindrical shape is inserted into the cylindrical bearing holder 12 having the closed bottom, and furthermore the rotating shaft 56 is inserted in the oil-impregnated sleeve bearing 34 and supported by it such that the rotating shaft 56 can freely rotate. Thus, it is possible to achieve a structure which can prevent the lubricant from leaking out without increasing the number of component elements and the number of assembling process steps.

In this brushless motor, since the bearing holder 12 has a cylindrical shape with a closed bottom and the oil-impregnated sleeve bearing 34 has a cylindrical shape, it is required to effectively remove the air existing in the oil-impregnated sleeve bearing 34 when the rotating shaft 56 is inserted into the oil-impregnated sleeve bearing 34 which is fit and held in the bearing holder 12. To achieve this, the brushless motor according to the above embodiment has radial grooves 32 on the bottom of the bearing holder 12, which provide communication of air between the inside and the outside of the oil-impregnated sleeve bearing 34. Furthermore, there is also provided the outer spaces 36 in the axis direction between the inner face of the bearing holder 12 and the outer face of the oil-impregnated sleeve bearing 34. The air which should be removed from the inside of the oil-impregnated sleeve bearing 34 can escape to the outside through the radial grooves 32 and the outer spaces 36. Therefore, the air inside the oil-impregnated sleeve bearing 34 does not cause obstruction of the insertion process of the rotating shaft 56.

On the other hand, since the bearing holder 12 has a cylindrical shape with a bottom, if some lubricant in a liquid phase exudes from the inner cylindrical layer 34b of the oil-impregnated sleeve bearing 34 to the space in the bearing, such lubricant tries to leak toward the open end side of the bearing holder 12, that is, tries to leak toward the base of rotating shaft 56. However, since the ring-shaped oil seal 45, which is in contact with the aperture-side end portion of the bearing holder 12 of the oil-impregnated sleeve bearing 34, has a relatively high percentage of voids, the lubricant is absorbed effectively by the oil seal 45, thereby effectively preventing the lubricant from leaking out to the outside. Thus, contamination in the peripheral area due to the scattering of the lubricant is prevented. Since the percentage of voids becomes lower in the order of the oil seal 45, the outer cylindrical layer 34a, and the inner cylindrical layer 34i, the lubricant absorbed into the oil seal 45 flows to the outer cylindrical layer 34a of the oil-impregnated sleeve bearing 34 due to the capillarity, and further flows to the inner cylindrical layer 34b from the outer cylindrical layer 34a. A part of the lubricant absorbed in the oil seal also flows directly toward the inner cylindrical layer. Since the lubricant circulates smoothly in the above-described manner, the life of the bearing and thus the total life of the motor become longer.

Figure 8:
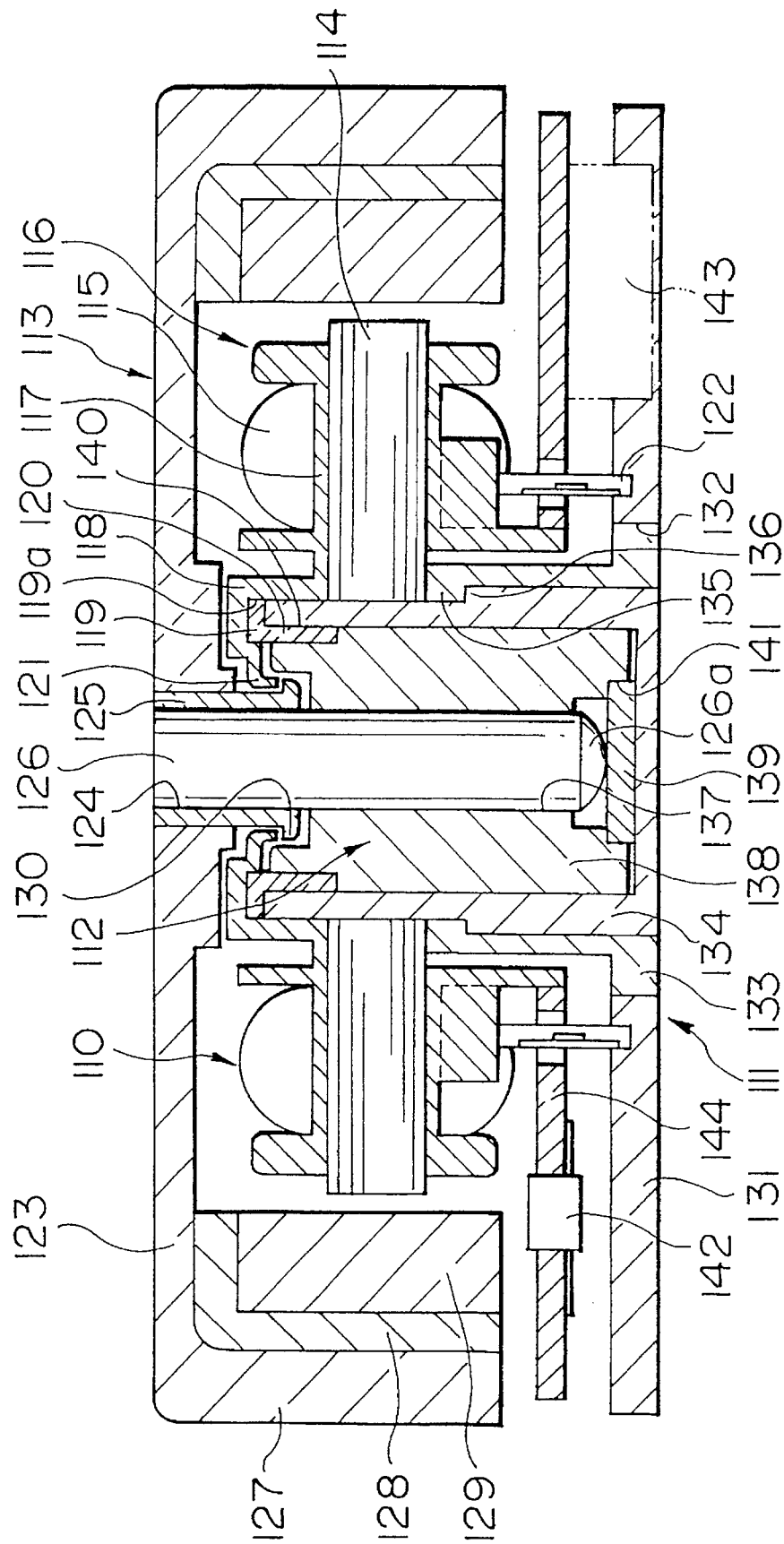
FIG. 8 is a cutaway elevational view illustrating a second embodiment of a brushless motor according to the present invention.
Figure 9:
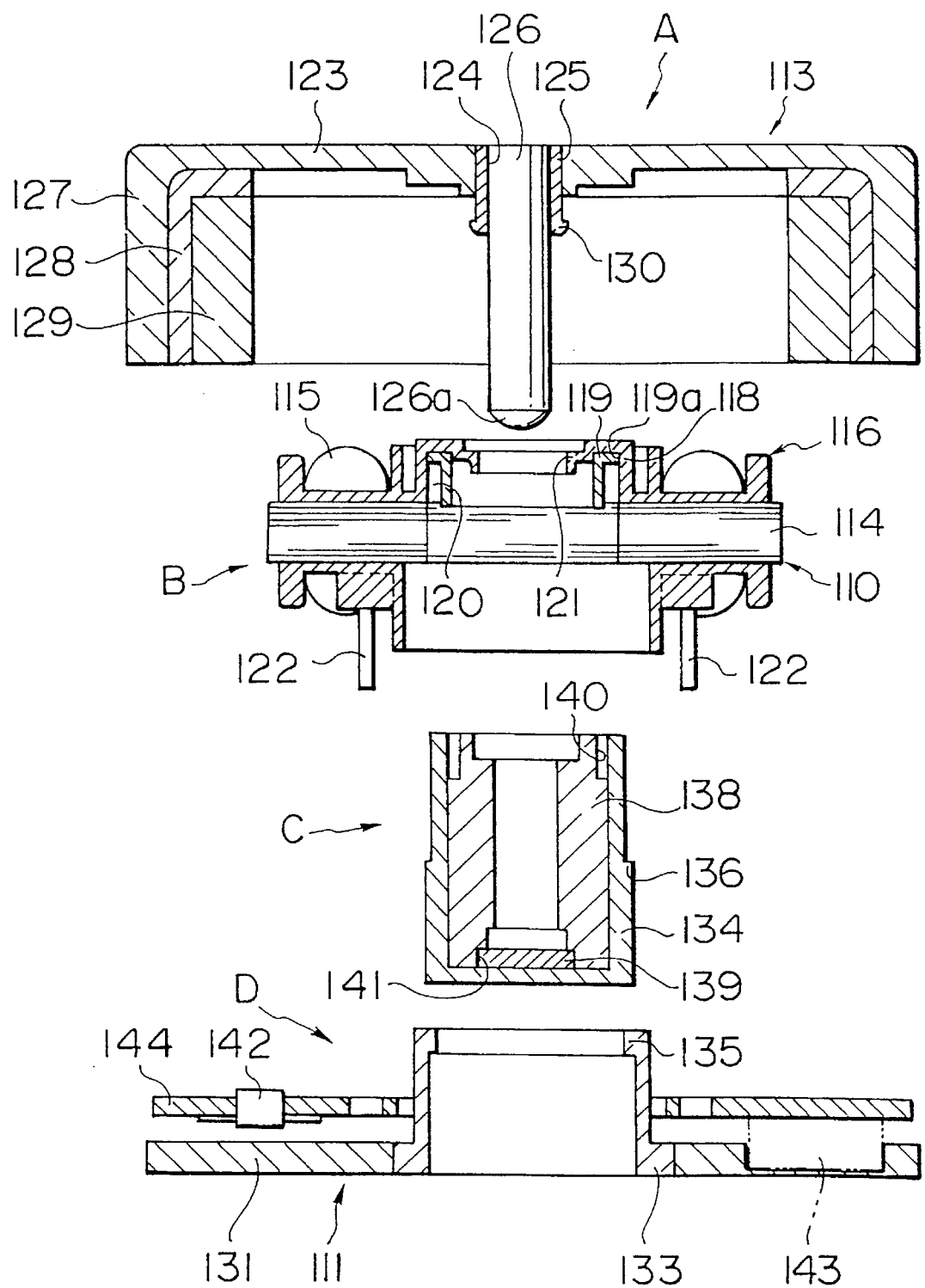
FIG. 9 is an exploded and cutaway elevational view illustrating assembling steps of the brushless motor shown in FIG. 8.

Referring to FIGS. 8 and 9, a second embodiment of a brushless motor according to the present invention will be described below.

The brushless motor of this embodiment includes a stator 110, a housing 111 in which the stator 110 is mounted, and a rotor 113 which is supported by the housing 111 via a sleeve bearing 112 in such a manner that the rotor 113 can freely rotate.

The stator 110 comprises a stator core 114 made up of a lamination of ring-shaped magnetic sheets, a stator coil 115 wound around the stator core 114, and an insulator 116 on which the stator core 114 and the stator coil 115 are mounted. The insulator 116 is made of an synthetic resin in an integral form, wherein a ring-shaped wall 118 whose cross-section has an inverted-L shape is formed on the upper side of the base 117 at the inner circumference. A hollow-cylinder-shaped metal bush 119 formed in an integral fashion by means of insert molding is disposed under the lower side of the ring-shaped wall 118.

The metal bush 119 has a cross-section with a substantial inverted-L shape. The metal bush 119 has a flange 119a at its upper end portion. The metal bush 119 is disposed in such a manner that a part of the flange 119a projects under the ring-shaped wall 118, and furthermore, the outer cylindrical face of the bush 119 and the inner cylindrical face of the ring-shaped wall 118 form a ring-shaped recess 120 whose aperture faces down. A ring-shaped protrusion 121 whose cross-section has a bent shape like an arc is formed on the inner side of the ring-shaped wall 118 in an integral fashion. A plurality of terminals 122 projecting downward are formed on the lower side of the base 117 of the insulator 116 by means of insert molding in an integral fashion. One end of terminal 122 is connected to one end of the stator coil 115.

The rotor 113 is made up of a synthetic resin into a cup shape, which comprises a disk-shaped main portion 123, a shaft 126 fit via a hollow-cylinder bush 125 in an opening 124 formed in the center of the main portion 123, and yoke 128 and magnet 129 fixed to the inner circumferential face of an outer cylindrical wall 127 formed on the outer circumference of the main portion 123. The shaft 126 is disposed such that it extends downward in the vertical direction from the lower side of the main portion 123. A spherical-surface portion 126a is formed at the lower end of the shaft 126. A ring-shaped protrusion 130 projecting outward is formed at the lower end of the bush 125. A plurality of blades (not shown) are disposed at a space in the circumferential direction on the outer circumferential face of the outer cylindrical wall 127.

The housing 111 comprises a disk-shaped base portion 131, a hollow cylinder 133 made of a synthetic resin having open ends wherein the hollow cylinder 133 is fit and held vertically in a through-hole 132 formed in the center of the base portion 131, and an bearing holder 134 made of metal whose upper end is open wherein the sleeve bearing 112 is disposed in the bearing holder 134. The hollow cylinder 133 is fastened to the outer circumferential portion of the metal bearing holder 134 at the upper end portion of the hollow cylinder 133. A ring-shaped protrusion 135 is formed on the inner circumferential face at the upper end portion of the hollow cylinder 133. A step 136 is formed on the outer circumferential face of the metal bearing holder 134 so that the step 136 may be fit with the ring-shaped protrusion 135.

The sleeve bearing 112 comprises a radial bearing 138 having a through-hole 137 formed in its central position. There is disposed a disk-shaped thrust bearing element 139 in contact with the end of the shaft 126. A ring-shaped cut-out portion 140 is formed on the outer circumferential face at the upper end portion of the radial bearing 138. A circular cut-out portion 141 is formed on the lower end face such that the circular cut-out portion 141 surrounds the through-hole 137. The radial bearing 138 is made of a porous material such as sintered metal capable of being impregnated with oil. The radial bearing 138 is made of for example a Teflon resin or a PPS-based composite resin.

The radial and thrust bearings 138 and 139 described above are disposed in the following manner. The thrust bearing element 139 is placed on the inner face of the bottom of the metal bearing holder 134, and the radial bearing 138 is then inserted into the metal bearing holder 134. The positioning is performed by fitting the thrust bearing element 139 into the circular cut-out portion 141. Thus, the metal bearing holder 134 surrounds both radial bearing 138 and thrust bearing element 139, and furthermore, a space in which the metal bush 119 is to be inserted is formed between the inner circumferential face of the upper end portion of the metal bearing holder 134 and the ring-shaped cut-out portion 140.

Various electric components are mounted on a printed circuit board 144, wherein the electric components includes a hall device 142 for detecting the position of the magnet 129 of the rotor 113, an IC 143 for controlling the current supplied to the stator coil 115, etc. The stator coil 115 is electrically connected to the printed circuit board 144 via the terminals 122.

Now a method of assembling a brushless motor having the above configuration will be described below. In the assembling of a brushless motor according to the present invention, component elements are first sub-assembled into four units A–D as shown in FIG. 9, and then assembled into one apparatus as follows.

The unit A is a sub-assembly associated with the rotor 113, in which the upper end portion of the shaft 126 is fit and fixed in the opening 124 of the main portion 123 via the bush 125, and the yoke 128 and the magnet 129 are fastened to the inner side of the outer cylindrical wall 127.

The unit B is a sub-assembly associated with the stator 110, in which the stator core 114 around which the coil 115 is wound is mounted on the insulator 116 including the metal bush 119 and terminals 122 formed in an integral fashion. The unit C is a sub-assembly associated with metal bearing holder 134 of the housing 111 and the radial and thrust bearings 138 and 139, in which the radial and the thrust bearings 138 and 139 are mounted in the metal bearing holder 134. The unit D is a sub-assembly associated with the base portion 131 of the housing 111 and the printed circuit board 144, wherein the hollow cylinder 133 is formed on the base portion 131 in an integral form.

In the assembling process of these four units A–D into one motor, the unit C is first incorporated into the unit D. The unit C is incorporated into the unit D from the lower side of the base portion 131. The metal bearing holder 134 is inserted from the lower side of the housing 111 into the hollow cylinder 133 so that the step 136 of the metal bearing holder 134 and the ring-shaped protrusion 135 formed on the inner circumferential face of the hollow cylinder 133 are fit with each other, whereby the metal bearing holder 134 is mounted on the housing 111.

The unit B is then incorporated into the combination of the units C and D. In this assembling step, the metal bearing holder 134 of the unit C is inserted from the lower side of the unit D into the stator core 115 at its center position and the upper end portion of the metal bearing holder 134 is inserted into the ring-shaped recess 120. At this assembling step, the outer circumferential face of the lower end portion of the metal bush 119 is fit closely into the inner circumferential face of the metal bearing holder 134. If required, the upper end face of the ring-shaped wall 118 of the insulator 116 is supported by a proper fixture, and force is applied to the lower side of the metal bearing holder 134 so as to push up the metal bearing holder 134 into the metal bush 119.

The above pushing-in process of the metal bearing holder 134 is continued until the upper end face of the metal bearing holder 134 comes in contact with the metal bush 119. It is preferable that the dimensions of the elements are set such that a small space is created between the inner circumferential face of the metal bush 119 and the ring-shaped cut-out portion 140 of the radial bearing 138. The dimensions of the elements may also be set such that the end of the hollow cylinder 133 may come in contact with the lower face of the stator core 114 at the time when the above assembling step is complete, and the stator core 114 may be positioned and supported by the hollow cylinder 133.

After the completion of incorporation of the unit B into the combination of the units C and D, the unit A is further incorporated. The incorporation of the unit A is performed by inserting the shaft 126 into the through-hole 137 of the radial bearing 138. In this insertion process of the shaft 126, interference occurs between the ring-shaped protrusion 130 of the bush 125 and the ring-shaped protrusion 121 of the insulator 116. However, since the ring-shaped protrusion 121 is made of a synthetic resin and has a relatively small thickness, the ring-shaped protrusion 121 can be deformed elastically with the movement of the ring-shaped protrusion 130. After the ring-shaped protrusion 130 has passed over the ring-shaped protrusion 121, the ring-shaped protrusion 121 is restored to the previous state by the elastic force.

When the spherical-surface portion 126a of the shaft 126 comes in contact with the upper face of the thrust bearing element 139, the incorporation of the unit A is complete, and thus the assembling of the motor is complete. It should be noted here that the mounting of the printed circuit board 144 is performed before the incorporation of the unit B, and terminals 122 are connected to the printed circuit board 144 by means of soldering after the completion of the incorporation of the unit B.

In the brushless motor configured in the above-described manner, the stator 110 is supported by the portion at which the metal bearing holder 134 is pushed into the metal bush 119. Since both pushing-in element materials are metal, almost no deformation due to the pushing-in process occurs. Thus, during the assembling process of the motor, there is no external force which affects the sleeve bearing 112, which ensures that smooth rotation of the rotor 113 may be achieved.

Furthermore, since the ring-shaped protrusion 121 is located above the sleeve bearing 112, even if the motor is placed in a fashion inverted to that shown in FIG. 8, the oil impregnated in the sleeve bearing 112 is dammed by the ring-shaped protrusion 121 and thus is prevented from leaking to the outside. Since the metal bearing holder 134 is fit closely in the metal bush 119, the leaking of the oil through the interface is also prevented.

In the above, embodiments of a brushless motor according to the present invention have been described. However, the present invention is not limited only to these specific embodiments. Various modifications and alternatives are also possible without departing from the scope and spirit of the present invention.

What is claimed is:

1. A brushless motor comprising:

a rotating shaft;

a bearing holder having a cylindrical shape with a closed bottom;

an oil-impregnated sleeve bearing having a cylindrical shape, said sleeve bearing being fit in said bearing holder and being held by the inner circumferential face of said bearing holder, said radial bearing supporting said rotating shaft in such a manner that said rotating shaft may freely rotate;

a thrust bearing element, said thrust bearing element being held on the bottom of said bearing holder at its central position, said thrust bearing element supporting the end portion of said rotating shaft in the axial direction;

a thrust bearing element holder for receiving and holding said thrust bearing element, said thrust bearing element holder having a cylindrical shape with a closed bottom and being disposed in the center of the bottom of said bearing holder, one end portion of an outer cylindrical layer of said oil-impregnated sleeve bearing being disposed outside the thrust bearing element holder, and an inner space being formed between the inner circumferential face of said end portion of the outer cylindrical layer and said thrust bearing element holder so that said inner space communicates with said outer space through said radial grooves;

a stator being fixed to the outer side of said bearing holder;

a rotor frame being fixed to said rotating shaft; and a rotor magnet being fixed to said rotor frame such that said rotor magnet is opposed to said stator;

said bearing holder being provided with a plurality of inward protrusions for supporting the outer circumferential face of said radial bearing, said plurality of inward protrusions being disposed on the inner circumferential face of said bearing holder at equal intervals in the circumferential directions;

an outer space being formed between the inner circumferential face of said bearing holder and the outer circumferential face of said radial bearing except for portions at which said plurality of inward protrusions support the radial bearing; and a radial groove being formed in the bottom of said bearing holder, said radial groove extending from the inner side of said radial bearing to said outer space, whereby air which should be removed from the inside of said radial bearing when said shaft is inserted in the inside of said radial bearing may escape to the outside through said radial groove and said outer space.

2. A brushless motor according to claim 1, wherein the oil-impregnated sleeve bearing includes an outer cylindrical layer having a relatively long length and inner cylindrical layers each having relatively short lengths, one of said inner cylindrical layers being disposed on the inner circumferential face of the upper end portion of said outer cylindrical layer, the other inner cylindrical layer being disposed on the inner circumferential face of the lower end portion of said outer cylindrical layer.

3. A brushless motor according to claim 1, wherein there are provided at least three inward protrusions which serve as said plurality of inward protrusions, said inward protrusions extending in the direction of the axis of said bearing holder.

4. A brushless motor according to claim 1, wherein said thrust bearing element holder is provided with a plurality of inward protrusions for supporting the outer circumferential face of said thrust bearing element, said plurality of inward protrusions being disposed on the inner circumferential face of said thrust bearing element holder at equal intervals in the circumferential directions, and wherein a space is formed between the inner circumferential face of said thrust bearing element holder and the outer circumferential face of said thrust bearing element except for portions at which said plurality of inward protrusions support the thrust bearing element.

5. A brushless motor according to claim 4, wherein grooves are formed in outer regions of the bottom of said thrust bearing element holder, the positions of said outer regions corresponding to the positions of said inward protrusions of said thrust bearing element holder, and wherein circumferential grooves are formed in inner regions of the bottom of said bearing holder, the positions of said inner regions corresponding to the positions of said inward protrusions of said thrust bearing element holder.

* * * * *